UNITED STATES PATENT OFFICE.

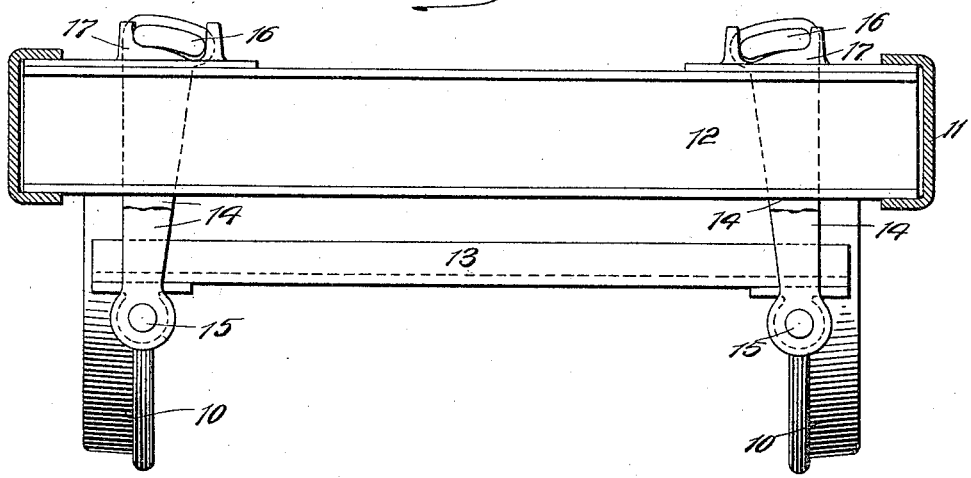
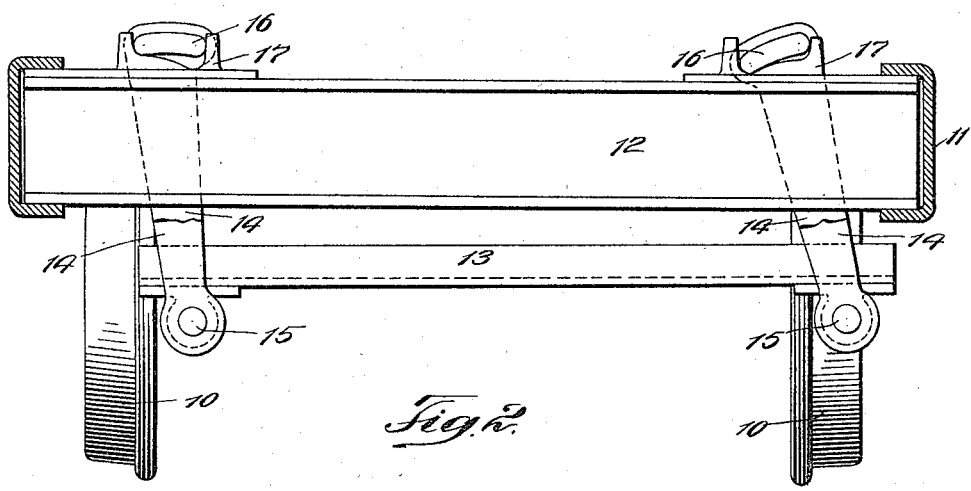

FRANK D. WARD, OF NEW YORK, N. Y.

CAR-TRUCK.

1,181,272.   Specification of Letters Patent.   Patented May 2, 1916.

Application filed July 30, 1915. Serial No. 42,674.

*To all whom it may concern:*

Be it known that I, FRANK D. WARD, a citizen of the United States, and a resident of the city, county, and State of New York, (whose post-office address is 17 Battery place, New York city,) have made a new and useful Improvement in Car-Trucks, of which the following is a description in such full, clear, and exact terms as will enable any person skilled in the art to which it pertains to make and use the same.

The object of my invention is to provide a car truck in which both the ease of riding and safety of the passenger will be increased during the time that the car passes a curve, without, however, disturbing the standard conditions of railroad practice or materially affecting the cost and complication of the truck structure.

To this end the invention consists in certain features of construction and combination of parts which will be fully described hereinafter and particularly pointed out in the claims.

Reference is now had to the accompanying drawings which represent as an example the preferred embodiment of the invention.

Figure 1 is an end elevation showing the parts of the truck immediately concerned with my invention and Fig. 2 is a similar view showing the same parts, but in the extreme position which they take when passing a curve in the road.

10 represents the wheels on the axle of which is mounted the truck frame 11 in the usual manner and 12 represents the transom which also may be of any desired form, the same being rigid with the truck frame and extending transversely between the same. 13 is the spring or sand plank which carries in the usual manner the car body through the medium of the springs and the car and truck-bolsters (not shown).

According to my invention the spring plank 13 is sustained on the transom by two links or pairs of links 14 which are pivoted at 15 to the spring plank and have lateral lugs or cams 16 at their upper ends which bear in seats 17 on the transom. (As will fully appear hereinafter, the positions of the pivots 15 and cams 16 may be reversed without change of functions or result). The spring plank, and indeed the entire car body, is thus supported by the links 14 which hang by their cams from the transom as explained.

As shown in Fig. 1 the lugs or cams 16 on the links are disposed oppositely or reversely to each other, *i. e.*, the outer part of each cam normally engages the seats 17, the inner parts inclining from the seats. The links 14 sustain or suspend the spring plank and hence the car body and when the car is quiet the links hang equally and function in the usual or ordinary manner as is shown in Fig. 1. Referring to Fig. 2, as the spring plank (and the car body) swings rightward by centrifugal force in turning a curve to the left, the outer or right hand link rocks its cam 16 downward on the seat 17 and the point of suspension or pivot of the link is progressively moved inward or backward with reference to the swinging motion, while the inner or left hand link rocks its cam 16 upward without changing the position of its pivot or point of suspension The links therefore swing with a non-parallel motion, the angularity of the outer or right hand link being the greater. Hence, according to my invention, when the car is running on straight track, the links are equal as in Fig. 1, but when the car takes a curve, the link at the inner side of the curve holds its pivot position and swings normally, while the outer link rocks its cam down, its pivot being thereby moved inward or backward from the direction of swinging gradually or progressively with the swinging motion. Owing to the cams the links do not suddenly change from one extreme to the other (which would result in a violent bumping or jarring of the car) but the links go over with a gradual or easy rolling motion which is transmitted as such to the car body and its occupants. When the car takes a curve in the opposite direction these movements are of course reversed. It should be noted that the links keep this sidewise movement of the spring plank, springs, bolsters and car body under control and confine the same within definite limits so that there is no danger of the bolsters moving endwise excessively and striking the truck frame. Further, by the peculiar differential action of the links as explained above, the "flinging" or excessive outward and upward throw of the car is counteracted and the comfort of the passenger greatly increased, the car body riding with an easier and less violent way, due to the fact that as the outward link increases its angularity it offers more and more or gradual resistance, to the outward "fling" or "send" of the car, but a gradual resistance—not a violent, abrupt stop.

Having thus described my invention what I claim as new and desire to secure by Letters Patent is:—

1. A car truck having suspension links with reversely set means for gradually or progressively changing the angularity of the links as the car body flings in turning a curve.

2. A car truck having suspension links with means for gradually or progressively increasing the angularity of the link at the outer side as the car turns a curve in the road.

3. A car truck having suspension links with means for automatically gradually or progressively moving the point of suspension of the outer link inward or away from the direction of swinging of the link under centrifugal force when turning a curve in the road, whereby the inner link swings normally and the outer link swings with increasing relative angularity.

4. A car truck having suspension links with reversely placed supporting cams or lugs set on their support so that they roll inward on the supports upon the outward swinging of the links, for the purpose specified.

In testimony whereof I have hereunto signed my name in the presence of two witnesses.

FRANK D. WARD.

Witnesses:
PATRICK A. BOLGER,
ISAAC B. OWENS.

Copies of this patent may be obtained for five cents each, by addressing the "Commissioner of Patents, Washington, D. C."